United States Patent
Son

(10) Patent No.: US 11,591,224 B2
(45) Date of Patent: Feb. 28, 2023

(54) APPARATUS AND METHOD FOR PREPARING CARBON BLACK

(71) Applicant: OCI COMPANY LTD., Seoul (KR)

(72) Inventor: Su-Jin Son, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 426 days.

(21) Appl. No.: 16/699,862

(22) Filed: Dec. 2, 2019

(65) Prior Publication Data

US 2020/0172403 A1 Jun. 4, 2020

(30) Foreign Application Priority Data

Nov. 30, 2018 (KR) .................. 10-2018-0152391

(51) Int. Cl.
  *C09C 1/50* (2006.01)
  *C01B 32/342* (2017.01)
  *F27B 3/24* (2006.01)
  *F27B 3/04* (2006.01)

(52) U.S. Cl.
  CPC .............. *C01B 32/342* (2017.08); *C09C 1/50* (2013.01); *F27B 3/04* (2013.01); *F27B 3/24* (2013.01); *C01P 2006/22* (2013.01)

(58) Field of Classification Search
  CPC ....................................................... C09C 1/50
  See application file for complete search history.

(56) References Cited

U.S. PATENT DOCUMENTS

| 6,156,837 A | 12/2000 | Branan, Jr. et al. |
| 9,676,943 B2 | 6/2017 | Dülger et al. |
| 9,938,465 B2 | 4/2018 | Dülger et al. |
| 2018/0134899 A1* | 5/2018 | Mulqueen ................ C09C 1/48 |

FOREIGN PATENT DOCUMENTS

| CN | 1492002 A | 4/2004 |
| CN | 102174277 A | 9/2011 |
| CN | 104470993 A | 3/2015 |
| EP | 0629222 A1 | 12/1994 |

OTHER PUBLICATIONS

"Applied Technology of Activated Carbon-Maintaining Manageability and Problem", Gao Shangyu compile, Nanjing: Southeast University Press, p. 44, Jul. 31, 2002, with English Translation.
Chinese Office Action dated Dec. 23, 2021, in connection with the Chinese Patent Application No. 201911216413.2, with English Translation.

* cited by examiner

*Primary Examiner* — Stuart L Hendrickson
(74) *Attorney, Agent, or Firm* — Hauptman Ham, LLP

(57) ABSTRACT

Disclosed are apparatus and method for preparing carbon black, in which the carbon black may be continuously formed and activated. In one embodiment, carbon black powders formed in a combustion reactor are converted into a slurry which in turn is refluxed to the combustion reactor in a repeated manner, thereby to allow successive activation treatments. In this way, a sufficient residence time for the activation of the carbon black may be secured.

10 Claims, 2 Drawing Sheets

APPARATUS AND METHOD FOR PREPARING CARBON BLACK

CROSS-REFERENCE TO RELATED APPLICATIONS

This application claims the priority of Korean Patent Application No. 10-2018-0152391 filed on Nov. 30, 2018 in the Korean Intellectual Property Office, the disclosure of which is hereby incorporated by reference in its entirety.

BACKGROUND

1. Technical Field

The present disclosure relates to an apparatus and method for preparing carbon black, in which the carbon black may be continuously formed and activated.

2. Description of the Related Art

In general, in a reforming process of carbon black, the carbon black is prepared from raw hydrocarbons and then the prepared carbon black is transferred to a separate reforming reactor in which a subsequent reforming process of the carbon black is carried out.

In this case, due to repeated transfers of a predetermined amount of the prepared carbon black based on a capacity of the reactor, there is a problem in that mass production is not possible and the process time is long. Further, an additional process is required to transfer the carbon black to the separate reactor. This may reduce an uniformity of the resulting reformed carbon black or lower a yield thereof.

Accordingly, in order to prepare carbon black having a large specific surface area, a method of injecting steam for activating carbon black into a combustion reactor into which fuel oil and feedstock oil are introduced to form the carbon black is employed.

However, in the above method, the steam introduced into the combustion reactor may act as a quenching liquid to prematurely terminate carbon black formation reaction to reduce the carbon black formation yield. Further, the method may not be suitable for preparation of carbon black having uniform physical properties.

SUMMARY

Under the technical background as mentioned above, a purpose of the present disclosure is to provide a carbon black preparation apparatus in which a separate reforming reactor for reforming carbon black (especially, activation for increasing a specific surface area thereof) is not required, but the reforming treatment of the carbon black is continuously performed in a combustion reactor to form the carbon black. Further, a purpose of the present disclosure is to provide a carbon black preparation method using the apparatus.

Further, another purpose of the present disclosure is to provide a carbon black preparation apparatus in which carbon black formed in a combustion reactor is converted into slurry which in turn is refluxed into the combustion reactor to perform reforming treatment continuously, thereby securing a sufficient residence time for activation of the carbon black. Further, a purpose of the present disclosure is to provide a carbon black preparation method using the apparatus.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In one aspect of the present disclosure, there is provided an apparatus for preparing carbon black, the apparatus comprising: a combustion reactor configured to form carbon black powders; a mixer located downstream of the combustion reactor, wherein the mixer is configured to mix the carbon black powders formed in the combustion reactor and a dispersion medium with each other to form a carbon black slurry; and a reflux unit located downstream of the mixer, wherein the reflux unit is configured to reflux the carbon black slurry formed in the mixer to the combustion reactor; wherein the combustion reactor includes: a first reaction region configured to receive and react fuel oil, feedstock oil and combustion-accelerating gas with each other; a second reaction region located downstream of the first reaction region, wherein the second reaction region is configured to receive the carbon black slurry formed in the mixer and to activate carbon black powders in the carbon black slurry; and a third reaction region located downstream of the second reaction region, wherein the third reaction region is configured to receive the activated carbon black powders and to eject a quenching liquid onto the activated carbon black powders.

In another aspect of the present disclosure, there is provided a method for preparing carbon black, the method comprising: a) introducing and reacting fuel oil, feedstock oil and combustion-accelerating gas into a first reaction region of a combustion reactor to form carbon black powders, wherein the combustion reactor are sequentially divided into the first reaction region, a second reaction region, and a third reaction region; b) mixing the carbon black powders formed in the a) with a dispersion medium to form a carbon black slurry; c) refluxing the carbon black slurry formed in the b) into the second reaction region of the combustion reactor; d) activating carbon black powders in the carbon black slurry in the second reaction region of the combustion reactor; and e) ejecting a quenching liquid onto the activated carbon black powders in the third reaction region of the combustion reactor.

In accordance with the present disclosure, a separate reforming reactor for reforming carbon black (especially, activation for increasing a specific surface area thereof) is not required, but the reforming treatment of the carbon black is continuously performed in a combustion reactor to form the carbon black.

Further, in accordance with the present disclosure, carbon black formed in a combustion reactor is converted into slurry which in turn is refluxed into the combustion reactor to perform reforming treatment continuously, thereby securing a sufficient residence time for activation of the carbon black.

DETAILED DESCRIPTIONS

Figure 1:
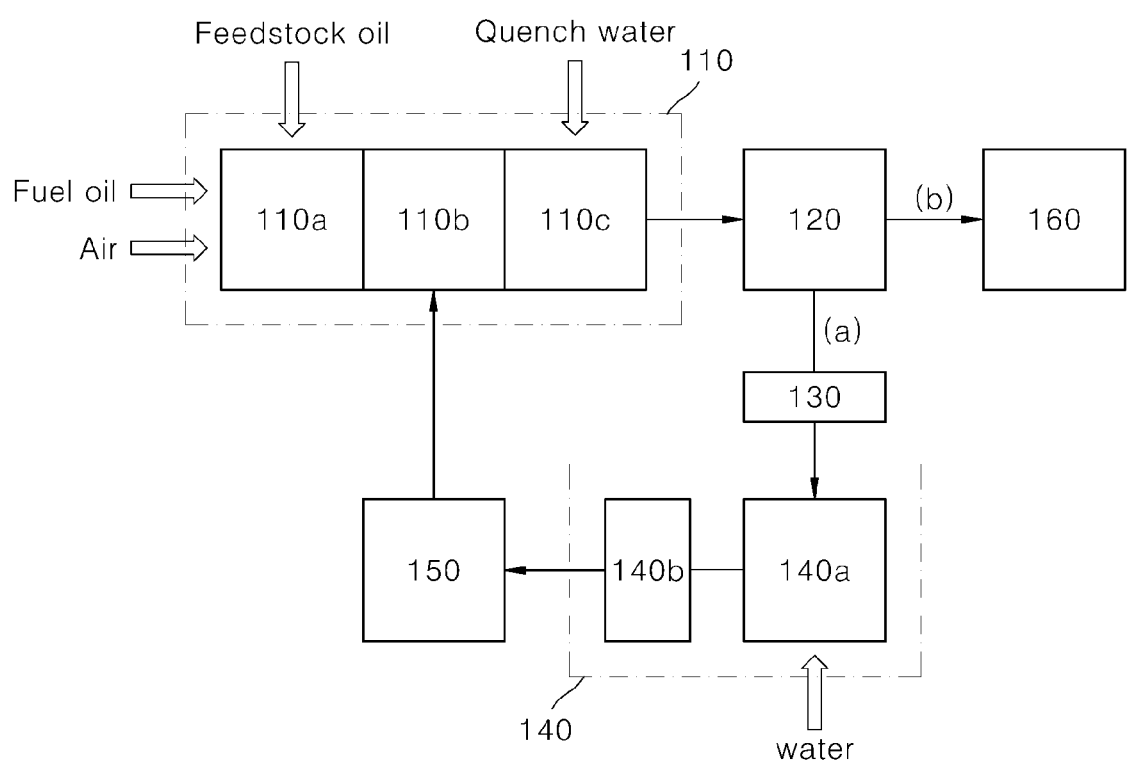
FIG. 1 schematically shows a configuration of a carbon black preparation apparatus according to an embodiment of the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now, carbon black preparation apparatus and method according to embodiments of the present disclosure will be described with reference to the accompanying drawings.

First Embodiment

FIG. 1 schematically shows a configuration of a carbon black preparation apparatus according to an embodiment of the present disclosure.

Referring to FIG. 1, the carbon black preparation apparatus 100 according to an embodiment of the present disclosure includes a combustion reactor 110 to form carbon black powders.

The combustion reactor 110 may be configured to receive feedstock oil, fuel oil and combustion-accelerating gas therein, and to perform incomplete combustion thereof to form carbon black powders. The combustion reactor 110 may be divided into a first reaction region 110a, a second reaction region 110b and a third reaction region 110c.

In accordance with the present disclosure, in order to define a location where each reaction occurs, the combustion reactor 110 is partitioned into the first reaction region 110a, the second reaction region 110b and the third reaction region 110c for convenience. In accordance with another example of the present disclosure, the combustion reactor 110 may include an additional reaction region in addition to the reaction regions as described above. It is to be understood that an additional reaction region may be interposed between the first reaction region 110a and the second reaction region 110b or may be interposed between the second reaction region 110b and the third reaction region 110c. However, the present disclosure is not limited thereto.

The fuel oil, feedstock oil and combustion-accelerating gas are added to the first reaction region 110a. The fuel oil, feedstock oil and combustion-accelerating gas may be added simultaneously or sequentially. The fuel oil, feedstock oil and combustion-accelerating gas as introduced into the first reaction region 110a may react with each other to form carbon black powders. Although not separately shown in FIG. 1, each of the fuel oil and feedstock oil may be stored separately in each storage tank and then may be supplied to the first reaction region 110a connected to each storage tank using a pump.

In accordance with the present disclosure, the fuel oil may be burned to achieve a reaction temperature at which carbon black powders are produced. The fuel oil may include fuel commonly used to prepare the carbon black powders. Non-limiting examples of the fuel oil may include liquid fuels, natural gas and coal gas such as diesel fuel, kerosene, bunker C oil, petroleum based FCC, EBO, creosote, soft pitch, coal-based coal tar, naphthalene, carboxylic acid, FCC, etc.

In accordance with the present disclosure, the feedstock oil acts to produce a seed of carbon black powders and may include a raw material commonly used to prepare carbon black powders. Non-limiting examples of the feedstock oil may include a liquid raw material, natural gas and coal gas such as gasoline, diesel, kerosene, bunker C oil, petroleum based FCC, EBO, creosote, soft pitch, coal based coal tar, naphthalene, carboxylic acid, and FCC, etc.

The combustion-accelerating gas may include air or oxygen as a gas for promoting combustion of the fuel oil.

Additionally, in accordance with the present disclosure, the first reaction region 110a may be divided into a reaction region in which the high temperature combustion-accelerating gas is used to combust the fuel oil to form combusted gases and achieve the reaction temperature at which the carbon black powders are produced, and a reaction region in which feedstock oil reacts with the combusted gases to form the carbon black powders.

In general, a temperature of the reaction region for forming the combusted gases may be 1,600° C. or higher. The higher the temperature of the combusted gases, the higher the productivity of the carbon black powders. However, the temperature of the combusted gases may be appropriately determined to be a temperature of 1,600° C. or higher in consideration of heat resistance of the combustion reactor. Further, the temperature of the reaction region where the combusted gases and the feedstock oil react with each other may be 1,600° C. or higher in consideration of the productivity of the carbon black powders as in the reaction region for forming the combusted gases.

The second reaction region 110b is located downstream of the first reaction region 110a. In the second reaction region 110b, carbon black slurry formed in a mixer 140 to be described later is input thereto and carbon black powders in the carbon black slurry are activated.

In accordance with the present disclosure, the activation of the carbon black refers to a reforming treatment in which pores are formed in a surface of the carbon black via a reaction of the carbon black with steam at high temperatures.

The third reaction region 110c is located downstream of the second reaction region 110b. Before transferring carbon black powders formed in the first reaction region 110a or activated in the second reaction region 110b to a subsequent process, a quenching liquid (for example, water) is sprayed onto the carbon black powder in the third reaction region 110c in order to lower the temperature of the carbon black powders to a temperature (for example, 600° C. to 950° C.) below a predetermined temperature. When the quenching liquid is injected onto the relatively high temperature carbon black powders, the temperature of the carbon black powders may be lowered as the quenching liquid evaporates.

In one example, the specific temperatures of the first reaction region 110a, the second reaction region 110b and the third reaction region 110c as described above may be appropriately changed depending on the properties of the carbon black powders as required.

The carbon black powders formed in the combustion reactor 110 may be transferred to storage 120 downstream of the combustion reactor 110. For the transfer of the carbon black powders, the combustion reactor 110 and the storage 120 may be connected to each other via a transfer pipe. The carbon black powders may be transferred using a transfer hopper, screw or air blower installed in the transfer pipe.

The carbon black powders temporarily stored in the storage 120 may be transferred to the mixer 140 via a foreign-substance remover 130. To transfer the carbon black powders, the storage 120 and the foreign-substance remover 130 may be connected to each other via a transfer pipe. The foreign-substance remover 130, and the mixer 140 may be connected to each other via a conveying pipe. The carbon black powders may be transferred using a transfer hopper, screw or air blower installed in the transfer pipe.

Further, the storage 120 may be configured for temporarily storing the carbon black powders formed in the combustion reactor 110, and may be omitted if necessary. That is, the carbon black powders formed in the combustion reactor 110 may be directly transferred to the mixer 140 through a transfer pipe, or may be transferred to the mixer 140 through the foreign-substance remover 130.

The mixer 140 may be located downstream of the combustion reactor 110 or storage 120 and may mix the carbon black powders from which foreign-substances are removed with a dispersion medium, thereby to form the carbon black slurry.

In the present embodiment, the carbon black slurry refers to a slurry in which the carbon black powders are dispersed in the dispersion medium. The dispersion medium for dispersing the carbon black powders may be preferably water.

In one embodiment, the carbon black slurry may contain 10 wt % to 50 wt % carbon black powders and 50 wt % to 90 wt % dispersion medium. A viscosity of the carbon black slurry may be 200 cps or lower, preferably 150 cps or lower.

When the content of the carbon black powders in the carbon black slurry exceeds 50% by weight, excessively high viscosity of the carbon black slurry may increase difficulty in transferring the carbon black slurry. Further, when spraying the carbon black slurry into the second reaction region 110b, a spray nozzle may be clogged.

The mixer 140 may include a pre-mixer 140a that mixes the carbon black powders and dispersion medium with each other at a relatively high speed (e.g., 1,000 rpm to 2,000 rpm), and a bead-mill 140b located downstream of the pre-mixer 140a. In the bead-mill 140b, the carbon black slurry mixed at the high speed in the pre-mixer 140a may be mixed at a relatively low speed of 50 rpm to 200 rpm to physically grind the carbon black powders in the carbon black slurry. The mixer 140 may include both of the pre-mixer 140a and bead-mill 140b or only one thereof.

A reflux unit 150 located downstream of the mixer 140 may be configured for storing the carbon black slurry formed in the mixer 140 while refluxing the carbon black slurry into the second reaction region 110b. In order to transfer the carbon black slurry, the mixer 140 and the reflux unit 150 may be connected to each other via a transfer pipe. The reflux unit 150 and the second reaction region 110b may be connected to each other via a transfer pipe. The carbon black slurry may be transferred using a pump installed in the transfer pipe.

A temperature of the carbon black slurry in the reflux unit 150 may be lower than 100° C., preferably 50° C. to 80° C. in order to prevent vaporization of the dispersion medium from the carbon black slurry. Further, the reflux unit 150 may further include stirring means to prevent dispersibility of the carbon black powders in the carbon black slurry from being lowered.

The carbon black slurry transferred from the reflux unit 150 to the second reaction region 110b through the transfer pipe may then be injected into the combustion reactor 110 using spraying means such as a spray nozzle disposed on an inner circumferential surface of the second reaction region 110b. The carbon black slurry is refluxed to the second reaction region 110b and thus does not affect the first reaction region 110a where the carbon black powders are formed. When the carbon black powders are formed in the first reaction region 110a, an amount of the formed carbon black powders is small, such that the properties of carbon black powders in the carbon black slurry are unlikely to be affected.

A temperature of the carbon black slurry injected into the combustion reactor 110 may be lower than 100° C., preferably 50° C. to 80° C. The injection pressure of the carbon black slurry may be lower than or equal to 15 kgf/cm$^2$.

As described above, in the second reaction region 110b, the carbon black slurry is refluxed thereto via the reflux unit 150 to activate carbon black powders in the carbon black slurry.

In this embodiment, the activation of the carbon black powders refers to a reforming treatment in which a specific surface area of the carbon black power is improved due to pores formed on the surface of the carbon black powders via the reaction of the carbon black and steam at a high temperature. The carbon black powders may contact the steam at the high temperature such that the carbon black powders are oxidized about defects on the surface thereof, that is, amorphous portions thereof, and, thus, the surface carbon is removed in a form of CO or $CO_2$. As a result, the pores are formed on the surface of the carbon black powders.

In this connection, the steam (water vapor) as an oxidant necessary for the activation of the carbon black powders may be generated when water used as the dispersion medium in the carbon black slurry is vaporized under a high ambient temperature in the second reaction region 110b. Accordingly, according to one embodiment of the present disclosure, there is an advantage that separate means for supplying the water vapor or steam into the combustion reactor 110 to activate the carbon black powders is not required.

In order to activate the carbon black powders in the carbon black slurry, it is necessary to form the high temperature atmosphere necessary for the water vapor to react with the surface of the carbon black powders in the combustion reactor 110.

To this end, when refluxing the carbon black slurry from the reflux unit 150 to the second reaction region 110b, it is necessary to form a high temperature atmosphere (1,100° C. to 1,700° C.) in the combustion reactor 110. Accordingly, an internal temperature of the combustion reactor 110 may be increased by adding the fuel oil and combustion-accelerating gas to the first reaction region 110a.

Therefore, when refluxing the carbon black slurry from the reflux unit 150 to the second reaction region 110b, a flow rate of the fuel oil introduced into the first reaction region 110a to form the high temperature atmosphere in the combustion reactor 110 may be 10% or lower, preferably 3% to 10% of a flow rate of the combustion-accelerating gas introduced to the first reaction region 110a.

In one example, the carbon black powders are combusted under the high temperature atmospheres (typically above 400° C.) in the presence of the combustion-accelerating gases (e.g., oxygen). Thus, when the combustion-accelerating gas is present in the combustion reactor 110 before refluxing the carbon black slurry to the second reaction region 110b, the carbon black powders in the carbon black slurry may be pyrolyzed.

Therefore, in order to exhaust the excessive amount of the combustion-accelerating gas present in the combustion reactor 110, the feedstock oil as well as the fuel oil and combustion-accelerating gas need to be added to the first reaction region 110a. In this connection, in order to completely exhaust the excessive amount of the combustion-accelerating gas present in the combustion reactor 110, a flow rate of the feedstock oil introduced into the first reaction region 110a may be preferably 1 to 3 times the flow rate of the fuel oil introduced into the first reaction region 110a.

As described above, when refluxing the carbon black slurry from the reflux unit 150 to the second reaction region 110b, an entirety of the dispersion medium in the carbon black slurry may be vaporized to act as an oxidizing agent for the activation of carbon black powders.

The pores formed on the surface of the carbon black powders via the activation of the carbon black powders may be classified, based on a diameter thereof, into a micropore having a diameter of smaller than 2 nm, a mesopore having a diameter between 2 nm and 50 nm, and a macropore having a diameter exceeding 50 nm. In general, in order to prepare highly conductive carbon black powders, it is advantageous to induce more mesopores on the surface of the carbon black powders compared to the micropore and macropore. Further, when the carbon black is mixed with a conductive resin, the micropore present on the surface of the carbon black may not be sufficiently impregnated with the conductive resin. Thus, in order to improve miscibility of the carbon black and the conductive resin, the mesopore is preferably present on the surface of the carbon black.

In order to induce more mesopores on the surface of carbon black powders compared to the micropore and macropore, it is necessary to secure a sufficient residence time for the activation of the carbon black powders performed in the second reaction region 110b.

According to the present embodiment, the sufficient residence time for the activation of the carbon black powders may be secured by continuously performing the activation treatment of the carbon black powders.

To this end, the carbon black powders formed first in the first reaction region 110a and then quenched in the third reaction region 110c are transferred to the mixer 140 along a path (a) in which the carbon black slurry may be formed. Then, the formed carbon black slurry may be refluxed into the second reaction region 110b. This process may continue a plurality of times. As the number of the refluxing of the slurry to the second reaction region 110b increases, a degree at which the carbon black powders are activated may be improved. The number of iterations of the refluxing of the carbon black powders into the second reaction region 110b may be appropriately adjusted depending on the properties of the carbon black powders as required.

Subsequently, when the sufficient activation of the carbon black powders is performed, the carbon black powders may be quenched in the third reaction region 110c and then transferred to a subsequent process 160 along a path (b).

The subsequent process 160 may include removing the foreign-substance from the activated carbon black powders, pelletizing the carbon black powders, packaging the carbon black powders, and the like.

Second Embodiment

Figure 2:
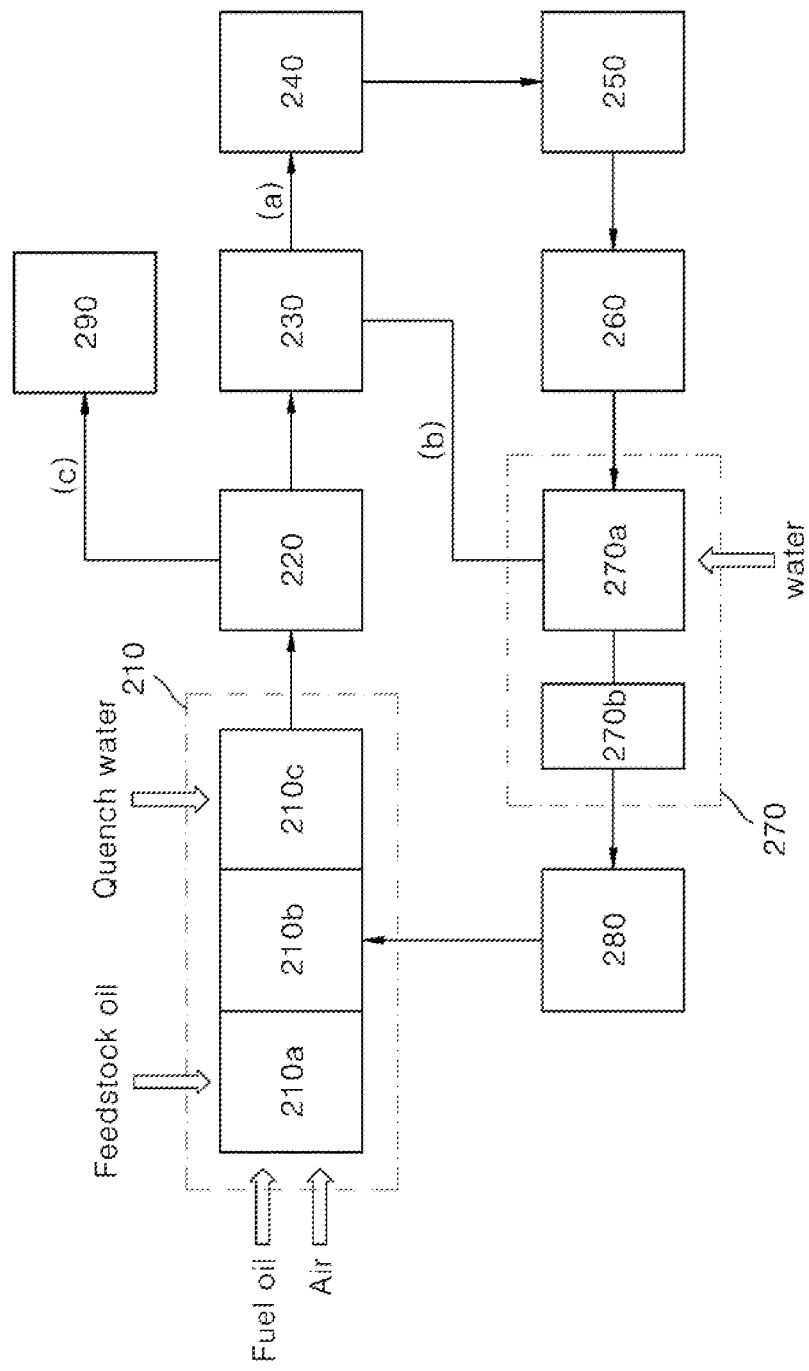
FIG. 2 schematically shows a configuration of a carbon black preparation apparatus according to another embodiment of the present disclosure.

FIG. 2 schematically shows a configuration of a carbon black preparation apparatus according to another embodiment of the present disclosure.

Referring to FIG. 2, a carbon black preparation apparatus 200 according to an embodiment of the present disclosure includes a combustion reactor 210 to form carbon black powders.

The combustion reactor 210 may be configured to receive feedstock oil, fuel oil and combustion-accelerating gas therein, and to perform incomplete combustion thereof to form carbon black powders. The combustion reactor 210 may be divided into a first reaction region 210a, a second reaction region 210b and a third reaction region 210c.

In accordance with the present disclosure, in order to define a location where each reaction occurs, the combustion reactor 210 is partitioned into the first reaction region 210a, the second reaction region 210b and the third reaction region 210c for convenience. In accordance with another example of the present disclosure, the combustion reactor 210 may include an additional reaction region in addition to the reaction regions as described above. It is to be understood that an additional reaction region may be interposed between the first reaction region 210a and the second reaction region 210b or may be interposed between the second reaction region 210b and the third reaction region 210c. However, the present disclosure is not limited thereto.

The fuel oil, feedstock oil and combustion-accelerating gas are added to the first reaction region 210a. The fuel oil, feedstock oil and combustion-accelerating gas may be added simultaneously or sequentially. The fuel oil, feedstock oil and combustion-accelerating gas as introduced into the first reaction region 210a may react with each other to form carbon black powders. Although not separately shown in FIG. 2, each of the fuel oil and feedstock oil may be stored separately in each storage tank and then may be supplied to the first reaction region 210a connected to each storage tank using a pump.

Additionally, in accordance with the present disclosure, the first reaction region 210a may be divided into a reaction region in which the high temperature combustion-accelerating gas is used to combust the fuel oil to form combusted gases and achieve the reaction temperature at which the carbon black powders are produced, and a reaction region in which feedstock oil reacts with the combusted gases to form the carbon black powders.

The second reaction region 210b is located downstream of the first reaction region 210a. In the second reaction region 210b, the carbon black slurry formed in a mixer 270 to be described later is input thereto and carbon black pellets in the carbon black slurry are activated.

The third reaction region 210c is located downstream of the second reaction region 210b. Before transferring carbon black powders formed in the first reaction region 210a or activated in the second reaction region 210b to a subsequent process, a quenching liquid (for example, water) is sprayed onto the carbon black powder in the third reaction region 210c in order to lower the temperature of the carbon black powders to a temperature (for example, 600° C. to 950° C.) below a predetermined temperature. When the quenching liquid is injected onto the relatively high temperature carbon black powders, the temperature of the carbon black powders may be lowered as the quenching liquid evaporates.

The carbon black powders formed in the combustion reactor 210 may be transferred to storage 220 downstream of the combustion reactor 210. For the transfer of the carbon black powders, the combustion reactor 210 and the storage 220 may be connected to each other via a transfer pipe. The carbon black powders may be transferred using a transfer hopper, screw or air blower installed in the transfer pipe. Further, the storage 220 may be configured for temporarily storing the carbon black powders formed in the combustion reactor 210, and may be omitted if necessary.

The carbon black powders temporarily stored in the storage 220 may be transferred to a grinder 240 via a foreign-substance remover 230. The grinder 240 may be configured to grind the carbon black powders in a uniform size. The carbon black powders pulverized in the grinder 240 may be transferred to a sub-mixer 25 for mixing the carbon black powders and water to form a carbon black slurry, before pelletizing the carbon black powders. For the transfer of the carbon black powders, the storage 220 and foreign-substance remover 230 may be connected to each other via a transfer piping. The foreign-substance remover 230 and grinder 240 may be connected to each other via a transfer piping. The grinder 240 and sub-mixer 250 may be connected to each other via a transfer piping. The carbon black powders may be transferred using a transfer hopper, screw or air blower installed in the transfer pipe. Subsequently, the carbon black slurry formed in the sub-mixer 250 may be transferred to a pelletizer 260 in which the carbon black slurry may be pelletized into carbon black pellets.

The carbon black pellets formed in the pelletizer 260 may be transferred to the mixer 270. For transfer of the carbon black pellets, the pelletizer 260 and the mixer 270 may be connected to each other via a transfer pipe. The carbon black pellets may be transported by means of transport hoppers, screws or air blowers installed in the transfer piping.

While being located downstream of the pelletizer 260, the mixer 270 mixes the carbon black pellets and a dispersion medium with each other to form the carbon black slurry.

In the present embodiment, the carbon black slurry means a slurry in which the carbon black pellets are dispersed in the dispersion medium. The dispersion medium for dispersing the carbon black powders may be water.

In one embodiment, the carbon black slurry may contain 10 wt % to 50 wt % carbon black pellets and 50 wt % to 90 wt % dispersion medium. A viscosity of the carbon black slurry may be 200 cps or lower, preferably 150 cps or lower.

When the content of the carbon black pellets in the carbon black slurry exceeds 50% by weight, the viscosity of the carbon black slurry may be excessively increased, thereby increasing the difficulty in transferring the carbon black slurry. Further, when spraying the carbon black slurry into the second reaction region 210b, a spray nozzle may be clogged.

The mixer 270 may include a pre-mixer 270a that mixes the carbon black pellets and dispersion medium with each other at a relatively high speed (e.g., 1,000 rpm to 2,000 rpm), and a bead-mill 270b located downstream of the pre-mixer 270a. In the bead-mill 270b, the carbon black slurry mixed at the high speed in the pre-mixer 270a may be mixed at a relatively low speed of 50 rpm to 200 rpm to physically grind the carbon black pellets in the carbon black slurry. The mixer 270 may include both of the pre-mixer 270a and bead-mill 270b or only one thereof.

A reflux unit 280 located downstream of the mixer 270 may be configured for storing the carbon black slurry formed in the mixer 270 while refluxing the carbon black slurry into the second reaction region 210b. In order to transfer the carbon black slurry, the mixer 270 and the reflux unit 280 may be connected to each other via a transfer pipe. The reflux unit 280 and the second reaction region 210b may be connected to each other via a transfer pipe. The carbon black slurry may be transferred using a pump installed in the transfer pipe.

A temperature of the carbon black slurry in the reflux unit 280 may be lower than 100° C., preferably 50° C. to 80° C. in order to prevent vaporization of the dispersion medium from the carbon black slurry. Further, the reflux unit 280 may further include stirring means to prevent dispersibility of the carbon black powders in the carbon black slurry from being lowered.

The carbon black slurry transferred from the reflux unit 280 to the second reaction region 210b through the transfer pipe may then be injected into the combustion reactor 210 using spraying means such as a spray nozzle disposed on an inner circumferential surface of the second reaction region 210b.

A temperature of the carbon black slurry injected into the combustion reactor 210 may be lower than 100° C., preferably 50° C. to 80° C. The injection pressure of the carbon black slurry may be lower than or equal to 15 kgf/cm².

As described above, in the second reaction region 210b, the carbon black slurry is refluxed thereto via the reflux unit 280 to activate the carbon black pellets in the carbon black slurry.

In order to activate the carbon black pellets in the carbon black slurry, it is necessary to form the high temperature atmosphere necessary for the water vapor to react with the surface of the carbon black pellets in the combustion reactor 210.

To this end, when refluxing the carbon black slurry from the reflux unit 280 to the second reaction region 210b, it is necessary to form a high temperature atmosphere (1,100° C. to 1,700° C.) in the combustion reactor 210. Accordingly, an internal temperature of the combustion reactor 210 may be increased by adding the fuel oil and combustion-accelerating gas to the first reaction region 210a.

Therefore, when refluxing the carbon black slurry from the reflux unit 280 to the second reaction region 210b, a flow rate of the fuel oil introduced into the first reaction region 210a to form the high temperature atmosphere in the combustion reactor 210 may be 10% or lower, preferably 3% to 10% of a flow rate of the combustion-accelerating gas introduced to the first reaction region 210a.

In one example, the carbon black pellets are combusted under the high temperature atmospheres (typically above 400° C.) in the presence of the combustion-accelerating gases (e.g., oxygen). Thus, when the combustion-accelerating gas is present in the combustion reactor 210 before refluxing the carbon black slurry to the second reaction region 210b, the carbon black pellets in the carbon black slurry may be pyrolyzed.

Therefore, in order to exhaust the excessive amount of the combustion-accelerating gas present in the combustion reactor 210, the feedstock oil as well as the fuel oil and combustion-accelerating gas need to be added to the first reaction region 210a. In this connection, in order to completely exhaust the excessive amount of the combustion-accelerating gas present in the combustion reactor 210, a flow rate of the feedstock oil introduced into the first reaction region 210a may be preferably 1 to 3 times the flow rate of the fuel oil introduced into the first reaction region 210a.

According to the present embodiment, the sufficient residence time for the activation of the carbon black pellets may be secured by continuously performing the activation treatment of the carbon black pellets.

For this purpose, the carbon black powders initially formed in the combustion reactor 210 are transferred to the foreign-substance remover 230 where the foreign-substance is removed. Then, the carbon black powders are pelletized via the pelletizer 260 along a path (a). Then, the carbon black pellets are fed to the mixer 270. Then, the carbon black slurry is formed in the mixer 270 and then refluxed to the second reaction region 210b. Subsequently, the carbon black pellets activated in the second reaction region 210b are transferred to the foreign-substance remover 230 where the foreign-substance is removed and then, are fed directly into the mixer 270 along a path (b). Then, the carbon black slurry may be formed in the mixer 270 and then refluxed to the second reaction region 210b. This process may be continuously repeated.

As the number of the refluxing to the second reaction region 210b increases, a degree of the activation of the carbon black pellet may improve. The number of the repetitions of refluxing the carbon black pellets into the second reaction region 210b may be appropriately adjusted depending on the properties of the carbon black pellets as required.

Subsequently, when the sufficient activation of the carbon black pellets has been performed, the carbon black pellets may be quenched in the third reaction region 110c and then transferred to a subsequent process 2900 along a path (c).

The subsequent process 290 may include removing the foreign-substance from the activated carbon black powders, packaging the carbon black pellets, and the like.

Hereinafter, specific examples of the present disclosure will be presented. However, the examples as described below are merely to specifically illustrate or explain the present disclosure an thus should not limit the present disclosure.

Activation of Carbon Black Powders

Present Example 1

Creosote as the feedstock oil, petroleum-based FCC as the fuel oil, and air as the combustion-accelerating gas were added into the first reaction region of the combustion reactor. Then, the reactor was heated to about 1,500° C. for reaction thereof to form carbon black powders. The powders were quenched by spraying a quenching liquid onto the carbon black powders in the third reaction region.

30 weight % of the quenched carbon black powders, and 70 weight % of water were mixed in the pre-mixer at 1,500 rpm for 3 hours to form the carbon black slurry. Then, the carbon black slurry was transferred to the bead-mill and mixed at 150 rpm for 2 hours.

The feedstock oil, fuel oil and combustion-accelerating gas were further introduced in the combustion reactor. After raising an internal temperature of the combustion reactor to about 1,500° C., the carbon black slurry at 60° C. was refluxed to the second reaction region of the combustion reactor, thereby to induce the activation of the carbon black powders in the carbon black slurry.

The quenching liquid was ejected onto the activated carbon black powders in the third reaction region. Then, after 1 hour, the quenched carbon black powders were obtained.

Present Example 2

The quenching liquid was ejected onto the activated carbon black powders in the third reaction region. A carbon black slurry was further prepared using the quenched carbon black powders and then was further refluxed to the second reaction region of the combustion reactor to obtain carbon black powders.

Comparative Example 1

Carbon black powders were formed in the same manner as in Present Example 1, except that no activation treatment was performed.

Comparative Example 2

Creosote as the feedstock oil, petroleum-based FCC as the fuel oil, and air as the combustion-accelerating gas were added into the first reaction region of the combustion reactor. Then, the reactor was heated to about 1,500° C. for reaction thereof to form carbon black powders. Water vapor was added to the second reaction region in an amount of 15% of the feedstock oil added to the first reaction region, thereby to activate the carbon black powders formed in the first reaction region. Then, the activated powders were quenched by spraying a quenching liquid onto the activated carbon black powders in the third reaction region.

Characterization of Activated Carbon Black Powders

The carbon black powders as obtained in Present Examples 1 and 2 and Comparative Examples 1 and 2 were measured in terms of a specific surface area ($N_2SA$, STSA), OAN (oil absorption number) and, a volume resistivity. The results are shown in Table 1 below.

(1) Specific surface area: $N_2SA$ (Total Surface Area) was measured according to ASTM D3037-93. STSA (External Surface Area) was measured according to ASTM D5816-96. $N_2SA$ may measure a surface area of a powder having a micropore with a diameter of 2 nm or smaller. STSA may measure a specific surface area that may interact with a polymer to predict a mesopore formation amount.

(2) OAN (oil absorption number) is measured by evaluating an oil adsorption amount of DBP (dibutyl phthalate) which may be contained in 100 g of carbon black, and was measured according to ASTM D-2414. The higher the OAN value, the more complex and developed the carbon black structure is.

(3) Volume resistivity was measured according to a following method using Mitsubishi MCP-T610:

Ethylene vinyl acetate (EVA) resin (LG Chem, EC28005) was mixed with carbon black powders of each of Present Examples 1 to 2 and Comparative Examples 1 to 2 so that a content of carbon black powders was 15 wt %. The mixture was blended for about 15 minutes using an internal mixer (HAAKE Rheocord 90). The mixture was formed into a sheet of a predetermined size using a hot press. A size of the sheet has 10 cm of a vertical dimension, 10 cm of a horizontal dimension, and a thickness of 2 mm. The volume resistivity was measured 9 times using the EVA sheet. An average value thereof was obtained.

TABLE 1

| Examples | | Present Example 1 | Present Example 2 | Comparative Example 1 | Comparative Example 2 |
|---|---|---|---|---|---|
| Specific surface area | $N_2SA$ ($m^2/g$) | 156 | 180 | 86 | 106 |
| | STSA ($m^2/g$) | 114 | 134 | 59 | 65 |
| | $N_2SA/STSA$ | 1.36 | 1.34 | 1.46 | 1.63 |
| OAN (ml/CB100 g) | | 152 | 160 | 146 | 150 |
| Volume resistivity (Ωcm) | | 0.037 | 0.045 | 0.010 | 0.013 |

Referring to the results of Table 1, $N_2SA$ and STSA of carbon black powders according to Comparative Example 2 in which carbon black powders were formed in the first reaction region and then was activated in the second reaction region may be improved, compared to those of Comparative Example 1 without the activation treatment. That is, even when the carbon black powders are formed in the first reaction region and then the activation treatment thereof is performed in the second reaction region, the specific surface area of the carbon black powders may be improved. Further, it may be seen that the OAN value of the carbon black powders according to Comparative Example 2 is larger than that in Comparative Example 1. Accordingly, a fact that the volume resistivity of carbon black powders according to Comparative Example 2 is greater than that in Comparative Example 1 may be expected to be due to a fact that the activation treatment improves the specific surface area of carbon black powders and develops the structure thereof.

However, the carbon black powders according to Comparative Example 2 may be seen to have a small increase in the volume resistivity in spite of the improvement of the specific surface area, especially, $N_2SA$ and OAN values, compared to the Comparative Example 1. This is because, despite the activation treatment, many micropores were formed on the surface of carbon black powders instead of the mesopores, which may improve conductivity. The larger a value of $N_2SA/STSA$, the more micropores exist on the surface of carbon black powders instead of the mesopores.

These results may be clearly seen from the results about Present Example 1 and Present Example 2. Although the carbon black powders according to Present Example 1 was subjected to only a single time activation treatment as in Comparative Example 2, the carbon black powders according to Present Example 1 has a high conductivity.

This result is due to a fact that in a different manner from that of Comparative Example 2 in which the water vapor is injected into the second reaction region of the combustion reactor for activation until quenching is carried out in the third reaction region, carbon black powders and water are mixed to form the carbon black slurry which in turn is injected to the second reaction region for activation in Present Example 1, and, thus, a sufficient residence time for activation of carbon black powders is secured in Present Example 1, compared to Comparative Example 2.

Due to the sufficient residence time as required for activation of carbon black powders according to Present Example 1, compared to Comparative Example 2, the carbon black powders according to Present Example 1 may have increased $N_2SA$ and STSA values, compared to Comparative Example 2, while $N_2SA/STSA$ value is decreased according to Present Example 1, compared to Comparative Example 2. That is, according to Present Example 1, a number of mesopores to act to increase the conductivity are formed on the surfaces of the carbon black powders, thereby improving the specific surface area.

Further, it may be seen that in Present Example 2, the activated carbon black powders according to Present Example 1 were refluxed to the second reaction region of the combustion reactor for activation treatment, the $N_2SA/STSA$ value decreased while the $N_2SA$ and STSA values increased, compared to Present Example 1.

As such, according to the present disclosure, the carbon black powders formed in the combustion reactor are converted into the slurry which in turn is refluxed to the combustion reactor in a repeated manner, thereby to allow the successive activation treatments. In this way, the sufficient residence time for the activation of the carbon black may be secured.

It is to be understood that the aforementioned embodiments are illustrative in all respects and not restrictive. Further, the scope of the present disclosure will be indicated by the following claims rather than the aforementioned description. Further, the meaning and scope of the claims to be described later, as well as all changes and modifications derived from the equivalent concept should be construed as being included in the scope of the present disclosure.

What is claimed is:

1. An apparatus for preparing carbon black, the apparatus comprising:
   a combustion reactor configured to form carbon black powders;
   a mixer located downstream of the combustion reactor, wherein the mixer is configured to mix the carbon black powders formed in the combustion reactor and a dispersion medium with each other to form a carbon black slurry; and
   a reflux unit located downstream of the mixer, wherein the reflux unit is configured to reflux the carbon black slurry formed in the mixer to the combustion reactor;

wherein the combustion reactor comprises:

a first reaction region configured to receive and react fuel oil, feedstock oil and combustion-accelerating gas with each other;

a second reaction region located downstream of the first reaction region, wherein the second reaction region is configured to receive the carbon black slurry and to activate carbon black powders in the carbon black slurry; and a third reaction region located downstream of the second reaction region, wherein the third reaction region is configured to receive the activated carbon black powders and to eject a quenching liquid onto the activated carbon black powders.

2. The apparatus of claim 1, wherein the apparatus is configured such that when the reflux unit refluxes the carbon black slurry formed in the mixer to the second reaction region, a flow rate of the fuel oil introduced into the first reaction region is about 3% to 10% of a flow rate of the combustion-accelerating gas introduced into the first reaction region.

3. The apparatus of claim 1, wherein the apparatus is configured such that when the reflux unit refluxes the carbon black slurry formed in the mixer to the second reaction region, a flow rate of the feedstock oil introduced into the first reaction region is about 1 to 3 times a flow rate of the fuel oil introduced into the first reaction region.

4. The apparatus of claim 1, wherein the carbon black slurry formed in the mixer contains a dispersion medium of 50% by weight to 90% by weight.

5. A method for preparing carbon black, the method comprising:
a) introducing and reacting fuel oil, feedstock oil and combustion-accelerating gas into a first reaction region of a combustion reactor to form carbon black powders, wherein the combustion reactor are sequentially divided into the first reaction region, a second reaction region, and a third reaction region;
b) mixing the carbon black powders formed in the a) with a dispersion medium to form a carbon black slurry;
c) refluxing the carbon black slurry formed in the b) into the second reaction region of the combustion reactor;
d) activating carbon black powders in the carbon black slurry in the second reaction region of the combustion reactor; and
e) ejecting a quenching liquid onto the activated carbon black powders in the third reaction region of the combustion reactor.

6. The method of claim 5, wherein the carbon black slurry formed in the b) contains the dispersion medium of 50% by weight to 90% by weight.

7. The method of claim 5, wherein a viscosity of the carbon black slurry is 200 cps or lower.

8. The method of claim 5, wherein prior to the d), a flow rate of the fuel oil introduced into the first reaction region is about 3% to 10% of a flow rate of the combustion-accelerating gas introduced into the first reaction region.

9. The method of claim 5, wherein prior to the d), a flow rate of the feedstock oil introduced into the first reaction region is about 1 to 3 times a flow rate of the fuel oil introduced into the first reaction region.

10. The method of claim 5, wherein after the e), the b) to the d) are repeated.

* * * * *